United States Patent
Fan et al.

(10) Patent No.: US 10,271,268 B2
(45) Date of Patent: Apr. 23, 2019

(54) METHOD FOR PRESENTING LIST OF ACCESS POINTS AND DEVICE THEREOF

(71) Applicant: Xiaomi Inc., Beijing (CN)

(72) Inventors: Jialin Fan, Beijing (CN); Heng Qu, Beijing (CN); Huixing Jia, Beijing (CN)

(73) Assignee: Xiaomi Inc., Beijing (CN)

( * ) Notice: Subject to any disclaimer, the term of this patent is extended or adjusted under 35 U.S.C. 154(b) by 74 days.

(21) Appl. No.: 14/868,016

(22) Filed: Sep. 28, 2015

(65) Prior Publication Data

US 2016/0095049 A1    Mar. 31, 2016

Related U.S. Application Data

(63) Continuation of application No. PCT/CN2015/074874, filed on Mar. 23, 2015.

(30) Foreign Application Priority Data

Sep. 30, 2014    (CN) .......................... 2014 1 0521208

(51) Int. Cl.
    *H04W 48/20*      (2009.01)
    *H04W 48/14*      (2009.01)
    *H04W 48/16*      (2009.01)

(52) U.S. Cl.
    CPC ........... *H04W 48/14* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2004/0165548 A1* | 8/2004 | Backes | H04L 47/125 370/328 |
| 2004/0264427 A1 | 12/2004 | Jaakkola et al. | |
| 2004/0266436 A1 | 12/2004 | Jaakkola et al. | |
| 2006/0264227 A1 | 11/2006 | Takahashi et al. | |
| 2007/0066304 A1 | 3/2007 | Lee | |

(Continued)

FOREIGN PATENT DOCUMENTS

| | | |
|---|---|---|
| CN | 101026513 A | 8/2007 |
| CN | 102223697 A | 10/2011 |

(Continued)

OTHER PUBLICATIONS

International Search Report to PCT/CN2015/074874, dated Jun. 29, 2015 (4p).

(Continued)

*Primary Examiner* — Brandon M Renner
(74) *Attorney, Agent, or Firm* — Arch & Lake LLP

(57) ABSTRACT

The present disclosure discloses a method for presenting a list of access points and a device thereof. The method includes: acquiring at least one identifiers of at least one wireless access points; determining whether at least one predetermined identifier exists among the identifiers of the wireless access points, wherein the predetermined identifier is an identifier corresponding to an accessing record stored in the terminal, and the accessing record is for indicating historical information that the terminal has ever accessed the wireless access point corresponding to the predetermined identifier; and if a result of the determining is that the at least one predetermined identifier exists, presenting the at least one predetermined identifier in the list of access points according to the accessing record corresponding to the at least one predetermined identifier.

10 Claims, 10 Drawing Sheets

(56) References Cited

U.S. PATENT DOCUMENTS

| | | |
|---|---|---|
| 2008/0181187 A1 | 7/2008 | Scott et al. |
| 2009/0061870 A1* | 3/2009 | Finkelstein .......... H04W 48/20 |
| | | 455/435.2 |
| 2011/0216692 A1* | 9/2011 | Lundsgaard .......... H04W 48/20 |
| | | 370/328 |
| 2011/0235624 A1 | 9/2011 | Scott et al. |
| 2011/0238824 A1 | 9/2011 | Scott et al. |
| 2011/0238847 A1 | 9/2011 | Scott et al. |
| 2011/0286437 A1* | 11/2011 | Austin .................... H04W 4/02 |
| | | 370/338 |
| 2013/0223340 A1* | 8/2013 | Jeong .................... H04W 48/16 |
| | | 370/328 |
| 2013/0223424 A1* | 8/2013 | Jiang .................... H04W 48/20 |
| | | 370/338 |
| 2014/0140288 A1* | 5/2014 | Jung .................... H04W 76/023 |
| | | 370/329 |
| 2014/0179237 A1* | 6/2014 | Gao ...................... H04W 4/025 |
| | | 455/67.11 |
| 2014/0269657 A1* | 9/2014 | Kim ...................... H04W 8/005 |
| | | 370/338 |
| 2014/0286326 A1* | 9/2014 | Jang .................... H04W 64/003 |
| | | 370/338 |
| 2015/0071248 A1* | 3/2015 | Faerber ............. H04W 36/0055 |
| | | 370/331 |

FOREIGN PATENT DOCUMENTS

| | | |
|---|---|---|
| CN | 102548023 A | 7/2012 |
| CN | 102938923 A | 2/2013 |
| CN | 103379480 A | 10/2013 |
| CN | 103686941 A | 3/2014 |
| CN | 104394263 A | 3/2015 |
| EP | 1542400 A2 | 6/2005 |
| EP | 2498551 A1 | 9/2012 |
| JP | 2010-087829 A | 4/2010 |
| JP | 2010-206543 A | 9/2010 |
| JP | 2012-085136 A | 4/2012 |
| RU | 2010118614 A | 11/2011 |
| WO | 2008061347 A1 | 5/2008 |

OTHER PUBLICATIONS

English Translation of International Search Report issued in corresponding International Application No. PCT/CN2015/074874, dated Jun. 29, 2015, 4 pages.

Extended European Search Report issued in corresponding EP Application No. 15187588, dated Feb. 15, 2016, 9 pages.

Office Action (including English translation) issued in corresponding Chinese Patent Application No. 201410521208.8, dated Apr. 19, 2016, 20 pages.

Office Action (including English translation) issued in corresponding Russian Patent Application No. 2015121718/07 (033800), dated Aug. 25, 2016, 13 pages.

Office Action (including English translation) issued in corresponding Japanese Patent Application No. 2016-550938, dated Dec. 14, 2016, 7 pages.

\* cited by examiner

METHOD FOR PRESENTING LIST OF ACCESS POINTS AND DEVICE THEREOF

CROSS-REFERENCE TO RELATED APPLICATIONS

The present application is a continuation of International Application No. PCT/CN2015/074874, filed Mar. 23, 2015, which is based upon and claims priority to Chinese Patent Application No. 201410521208.8, filed Sep. 30, 2014, the entire contents of which are incorporated herein by reference.

TECHNICAL FIELD

The present disclosure generally relates to the field of electronic display, and more particularly, to a method for presenting a list of access points and a device thereof.

BACKGROUND

Before establishing a connection with a Wi-Fi (Wireless Fidelity) access point, a wireless-enabled terminal such as a smart phone typically presents to a user an identifier of each of scanned access points in a form of a list, for the user to select one access point from the list to access.

In the related art, the terminal typically presents the identifier of each of the scanned Wi-Fi access points in a list of access points according to an English dictionary order. For example, when the identifiers of the Wi-Fi access points are composed of English letters, the terminal firstly compare initial letters of the identifiers of the scanned Wi-Fi access points, then presents an identifier of a Wi-Fi access point which has an initial letter in the front of the English dictionary at a top end of the list of access points. For identifiers with a same initial letter, second letters will then be compared according to the English dictionary order, and so on, so forth.

SUMMARY

A method for presenting a list of access points and a device thereof are provided by the present disclosure. The technical solutions are as follows.

In a first aspect, there provides a method for presenting a list of access points. The method may be implemented by a terminal and may include following acts: acquiring at least one identifiers of at least one wireless access points; determining whether the at least one identifiers include a predetermined identifier, wherein the predetermined identifier is an identifier corresponding to an accessing record stored in the terminal, and the accessing record indicates historical information that the terminal has ever accessed the wireless access point corresponding to each of the at least one predetermined identifiers. When the terminal determines that the at least one identifiers include the at least one predetermined identifiers, the terminal present the at least one predetermined identifiers in an initial part of the list of access points according to accessing records corresponding to the at least one predetermined identifiers.

In a second aspect, there provides a terminal device for presenting a list of access points. The terminal device may include: a processor; and a memory for storing instructions executable by the processor. The processor is configured to: acquire at least one identifiers corresponding to at least one wireless access points; and determine whether the at least one identifiers include at least one predetermined identifiers. Each of the at least one predetermined identifiers is an identifier corresponding to an accessing record stored in the terminal device. The accessing record indicates historical information that the terminal device has ever accessed the wireless access point corresponding to each of the at least one predetermined identifiers. When the terminal device determines that the at least one identifiers include the at least one predetermined identifiers, present the at least one predetermined identifiers in an initial part of the list of access points according to the accessing record corresponding to the at least one predetermined identifiers.

In a third aspect, there provides a non-transitory storage medium having stored therein instructions to be executed by a terminal. When executed by one or more processors of a terminal for presenting a list of access points, the instructions causes the terminal to perform acts including: acquiring at least one identifiers of wireless access points; determining whether the at least one identifiers include at least one predetermined identifiers, where each of the at least one predetermined identifiers is an identifier corresponding to an accessing record stored in the terminal. The accessing record indicates historical information that the terminal has ever accessed a wireless access point corresponding to each of the at least one predetermined identifiers. When the terminal determines that the at least one identifiers include the at least one predetermined identifiers, presenting the at least one predetermined identifiers in an initial part of the list of access points according to accessing records corresponding to the at least one predetermined identifiers.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
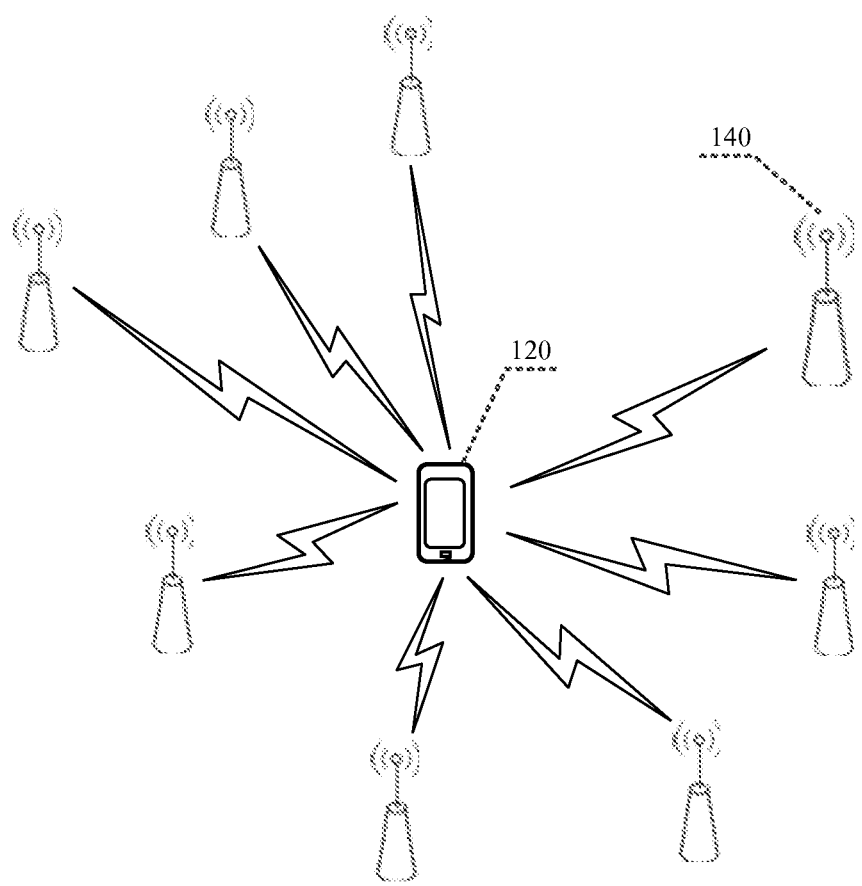
FIG. 1 is a schematic diagram of an implementing environment involved in a method for presenting a list of access points according to some exemplary embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

When a large number of Wi-Fi access points are scanned by the terminal, if the identifiers of these Wi-Fi access points are presented in the list of access points according to the English dictionary order, the user cannot quickly find the Wi-Fi access point which he/she intends to access, which may waste user's time and affect user experience.

To solve the above problem, the disclosure provides a method implemented by a terminal device. The terminal device is configured to acquire at least one identifiers corresponding to at least one wireless access points. The terminal device further determines whether the at least one identifiers include at least one predetermined identifiers stored in the terminal device. Each of the at least one predetermined identifiers is an identifier corresponding to an accessing record stored in the terminal device. The accessing record may indicate historical information that the terminal device has ever accessed the wireless access point corresponding to each of the at least one predetermined identifiers. When the terminal device determines that the at least one identifiers include the at least one predetermined identifiers, the terminal device may present the at least one predetermined identifiers in an initial part of the list of access points according to the accessing record corresponding to the at least one predetermined identifiers. The advantageous effects brought by the technical solutions according to the embodiments of the present disclosure include the following:

When the terminal device determines that at least one identifiers include the at least one predetermined identifiers, the terminal device may present the at least one predetermined identifiers in the initial part of the list of access points. The terminal device may present the initial part in a more conspicuous manner. Thus, the predetermined identifiers may be presented in a more conspicuous manner so that the user of the terminal device may select one of the predetermined identifiers with one touch. The terminal device and method may solve the problem in the related art that when a large number of Wi-Fi access points are available to be accessible by the terminal, the user cannot quickly find the Wi-Fi access point which he/she intends to access, and it achieves the objective of saving user's time and improving user experience.

Referring to FIG. 1, which is a schematic diagram of an implementing environment involved in a method for presenting a list of access points provided by exemplary embodiments of the present disclosure. The implementing environment includes: a terminal 120 and some wireless access points 140.

The terminal 120 may be a smart terminal which may access a wireless network, such as a smart phone, a tablet computer, an E-book reader, a laptop computer or a desktop computer connected with a wireless network adapter, or any computing device having wireless circuit configured to communicate wirelessly with other electronic devices.

The wireless access point 140 may be a Wi-Fi access point or other network devices.

Figure 2:
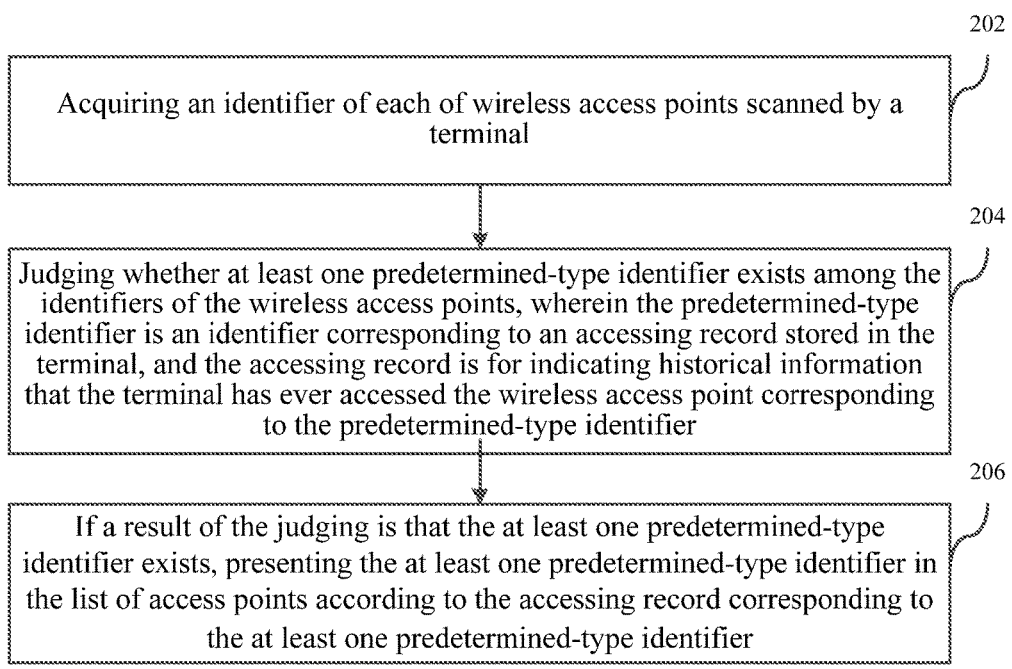
FIG. 2 is a flow chart of a method for presenting a list of access points according to an exemplary embodiment.

FIG. 2 is a flow chart of a method for presenting a list of access points according to an exemplary embodiment. In the present embodiment, the method for presenting a list of access points is applied in, for example, the implementing environment as shown in FIG. 1. The method for presenting a list of access points may be implemented in the terminal 120 in the implementing environment as shown in FIG. 1. As shown in FIG. 2, the method for presenting a list of access points may include the following steps.

In step 202, the terminal device may acquire at least one identifiers corresponding to at least one wireless access points. The at least one wireless access points may be accessible to the terminal device using wireless communication technology. For example, the terminal may send a Wi-Fi signal to scan accessible network devices in different Wi-Fi channels.

In step 204, the terminal device may determine whether the at least one identifiers include at least one predetermined identifiers, where the predetermined identifier is an identifier corresponding to an accessing record stored in the terminal. The accessing record may indicate historical information that the terminal has ever accessed the wireless access point corresponding to the predetermined identifier.

In step 206, when the terminal device determines that the at least one identifiers include the at least one predetermined identifier, the terminal device may present the at least one predetermined identifiers in an initial part of the list of access points according to the accessing records corresponding to the at least one predetermined identifiers.

In the embodiment of the present disclosure, when it is determined that an identifier of a scanned wireless access point corresponds to an accessing record stored in the terminal, it may be determined that the wireless access point is a wireless access point that the terminal has ever accessed. Since the user may probably select the wireless access point once again, the identifier of the wireless access point shall be presented in the list of access points in a more conspicuous manner when the list of access points is displayed, such that the user may more easily find the wireless access point he/she intends to access, so as to save the user's time. For example, the terminal device may display the initial part in a different font size or with different font style. Additionally or alternatively, the terminal device may display the initial part with special display settings preset by a user of the terminal device.

Accordingly, in the method for presenting a list of access points provided by the embodiment of the present disclosure, by acquiring an identifier of each of wireless access points scanned by a terminal, if it is determined that at least one predetermined identifier exists among the identifiers of the wireless access points, the terminal presents the at least one predetermined identifier in the list of access points according to the accessing record corresponding to the at least one predetermined identifiers, such that an identifier of a wireless access point may be presented in the list of access points in a more conspicuous manner if it is determined that the scanned wireless access point is a wireless access point that the terminal has ever been connected to, thereby it may solve the problem in the related art that when a large number of Wi-Fi access points are scanned by the terminal, the user cannot quickly find the Wi-Fi access point which he/she intends to access, and it may achieve the objective of saving user's time and improving user experience.

For instance, there may be many methods for the terminal to present the at least one predetermined identifier in the list of access points according to the accessing record corresponding to the at least one predetermined identifier. For example, the terminal may presents the at least one predetermined identifier at a top end of the list of access points. Alternatively or additionally, the terminal device may present the at least one predetermined identifiers with a special color, background or pattern preset by a user of the terminal device. Further, the terminal device may present the accessing record corresponding to the predetermined identifier in a display area of the predetermined identifier in the list of access points. In the following embodiments of the present disclosure, the solution of the present disclosure will be described in detail with an example in which the at least one predetermined identifier is presented at a top end of the list of access points.

Figure 3:
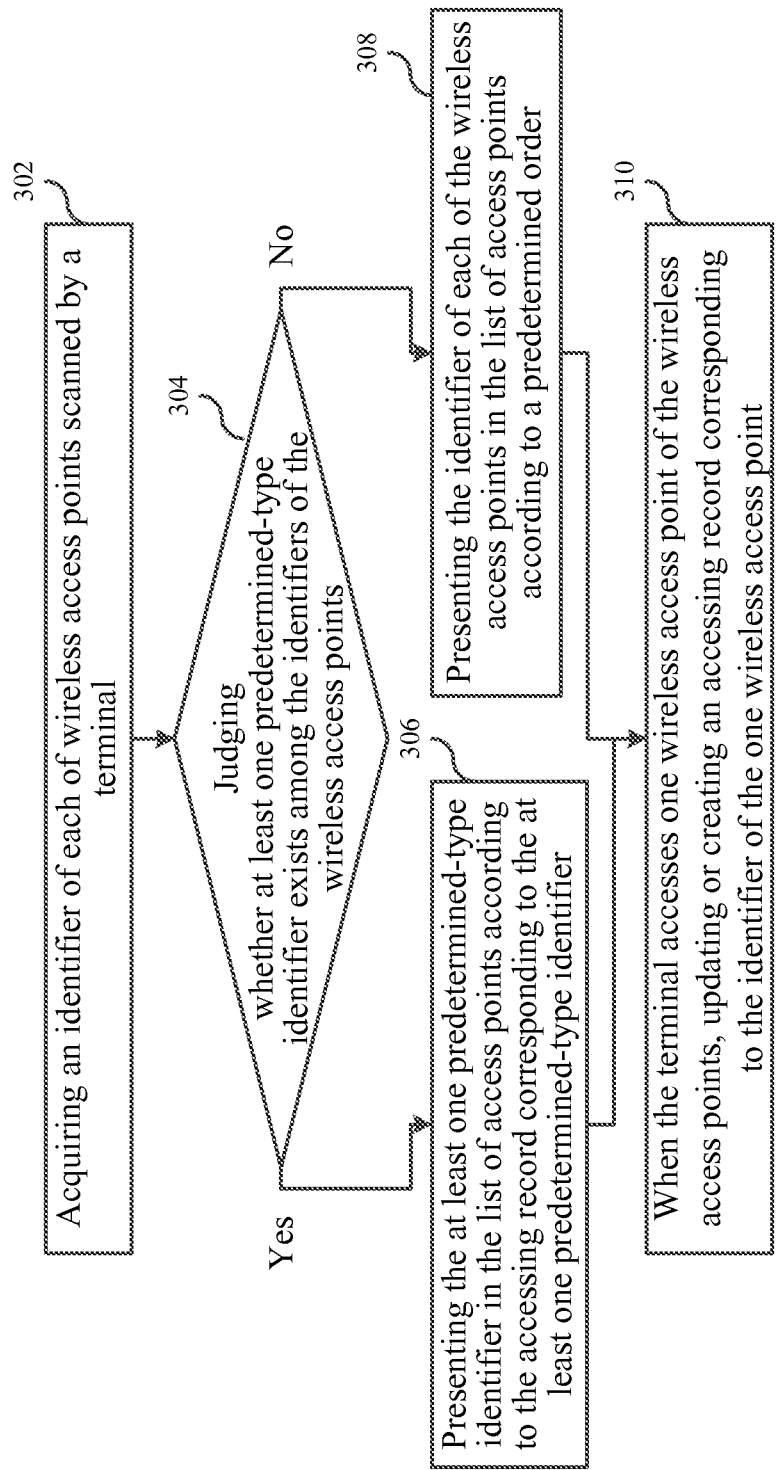
FIG. 3 is a flow chart of a method for presenting a list of access points according to another exemplary embodiment.

FIG. 3 is an example flow chart of a method for presenting a list of access points according to another exemplary embodiment. In the present embodiment, the method for presenting a list of access points is applied in, for example, the implementing environment as shown in FIG. 1, wherein the method for presenting a list of access points is applied to the terminal device 120 in the implementing environment as shown in FIG. 1. As shown in FIG. 3, the method for presenting a list of access points may include the following steps.

In step 302, the terminal device may acquire at least one identifiers corresponding to wireless access points scanned by the terminal device.

Wherein an identifier of a wireless access point may be a SSID (Service Set Identifier) of the corresponding wireless access point.

For example, in case where the terminal is a smart phone, the wireless access point is a Wi-Fi access point, and the identifier of the access point is a SSID of the access point, and when the smart phone scans the access points, after it receives a beacon frame periodically sent by a Wi-Fi access point near the smart phone, the smart phone sends a probe request frame to the Wi-Fi access point. After receiving the probe request frame, the Wi-Fi access point returns a probe response frame carrying with a SSID of the Wi-Fi access point to the smart phone.

In step 304, the terminal device may determine whether the at least one identifiers include the at least one predetermined identifiers. If the at least one predetermined identifiers exist in the at least one identifiers, the method proceeds to step 306. If no predetermined identifiers exist, the method proceeds to step 308.

The predetermined identifier is an identifier corresponding to an accessing record stored in the terminal, and the accessing record is for indicating historical information that the terminal has ever accessed the wireless access point corresponding to the predetermined identifier.

Here, the smart phone may include a local database that stores the identifier of the Wi-Fi access point that has been ever accessed by the smart phone. The local database may further store the accessing record corresponding to the identifier of the Wi-Fi access point that has been ever accessed by the smart phone. The accessing record may contain a record indicating a number of accessing times that the smart phone accessed the Wi-Fi access point. The accessing record may further contain a record indicating a time point of each time the smart phone accessed the Wi-Fi access point. Alternatively or additionally, the accessing record may contain a record indicating a combined effect from both a number of times that the smart phone accessed the Wi-Fi access point and a time point of each time the smart phone accessed the Wi-Fi access point. For example, the record indicating the combined effect may be a number obtained using a function with two inputs: the number of accessing times and the elapsed time from the most recent accessing time point to the current time.

In step 306, the at least one predetermined identifier is presented in the list of access points according to the accessing record corresponding to the at least one predetermined identifier.

When the accessing record contains a number of accessing times that the terminal accessed the wireless access point corresponding to the predetermined identifier, the at least one predetermined identifier is presented at a top end of the list of access points according to a large-to-small order of the number of accessing times that the terminal accessed the wireless access point corresponding to the at least predetermined identifier. When the accessing record contains a time that the terminal most recently accessed the wireless access point corresponding to the predetermined identifier, the at least one predetermined identifier is presented at a top end of the list of access points according to a late-to-early order of the time that the terminal most recently accessed the wireless access point corresponding to the at least predetermined identifier.

For example, in case where the terminal is a smart phone, the wireless access point is a Wi-Fi access point, and the identifier of the access point is a SSID of the access point, assuming that 6 Wi-Fi access points are scanned by the smart phone scans, the SSIDs of the 6 Wi-Fi access points are respectively Axxxx, Bxxxx, Cxxxxx, Dxxxxx, Exxxxx and Fxxxxx, wherein Bxxxx, Cxxxxx and Exxxxx are predetermined identifiers. Accordingly, the smart phone may include a local database that stores accessing records respectively corresponding to Bxxxx, Cxxxxx and Exxxxx, indicating that the smart phone has ever accessed these Wi-Fi access points corresponding to these SSIDs. The schematic diagrams of presenting two kinds of predetermined identifiers provided by the embodiments of the present disclosure are respectively as shown in FIGS. 4 and 5.

Figure 4:
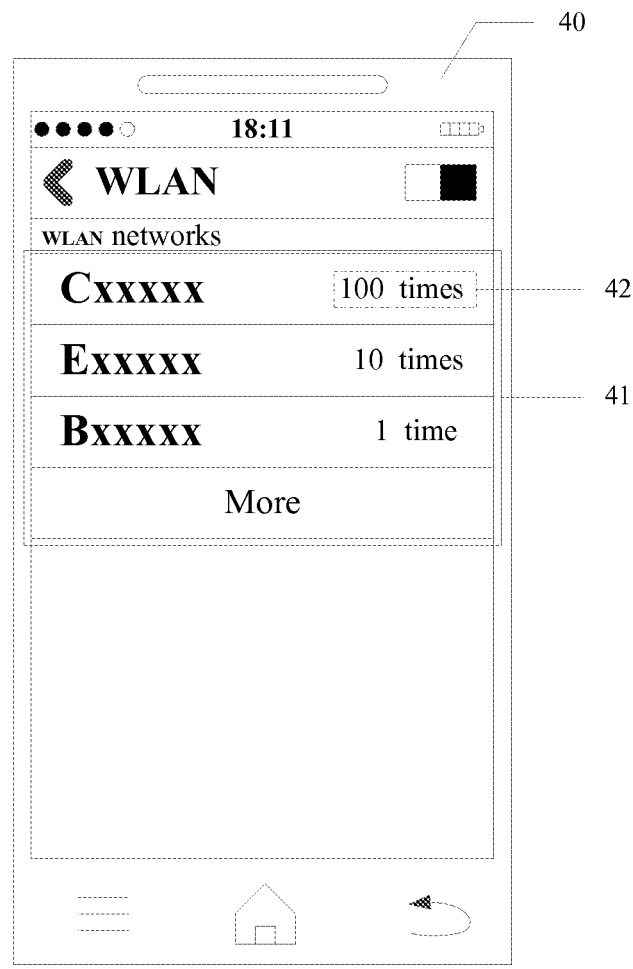
FIG. 4 is a schematic diagram of presenting a predetermined identifier according to another exemplary embodiment.

As shown in FIG. 4, when an accessing record corresponding to a SSID stored in a smart phone 40 contains a number of accessing times that the smart phone accessed the access point corresponding to the SSID, the smart phone 40 may present Bxxxx, Cxxxxx and Exxxxx at a top end of a list 41 of access points according to a large-to-small order of the number of accessing times, wherein the access point corresponding to Cxxxxx has the most times (100 times), the access point corresponding to Exxxxx has times (10 times) in the middle, the access point corresponding to Bxxxx has the least times (1 time). The smart phone 40 presents Cxxxxx at a first position of the list 41 of access points from top to down, presents Exxxxx at a second position and presents Bxxxxx at a third position. Meanwhile, the number of times accessed by the smart phone is displayed at a designated position 42 at a right side of each SSID.

Figure 5:
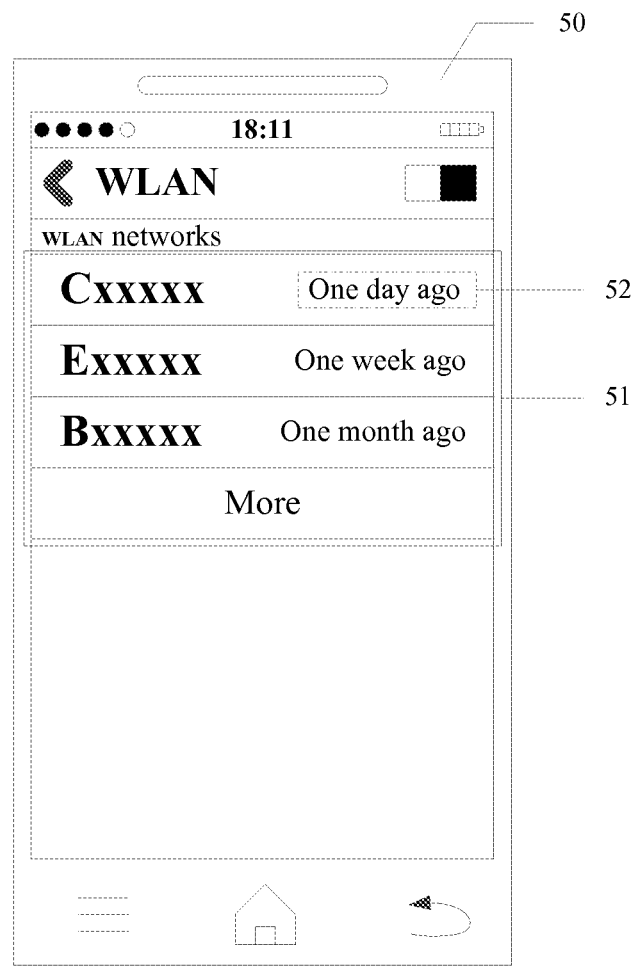
FIG. 5 is a schematic diagram of presenting another predetermined identifier according to another exemplary embodiment.

Alternatively, as shown in FIG. 5, when an accessing record corresponding to a SSID stored in a smart phone 50 contains a time point that the smart phone 50 most recently accessed the access point corresponding to the SSID, the smart phone 50 may present Bxxxx, Cxxxxx and Exxxxx at a top end of a list 51 of access points according to a late-to-early order of the time point of the most recent access, wherein a time that the smart phone 50 most recently accessed the access point corresponding to Cxxxxx is latest (one day ago), secondly is the access point corresponding to Exxxxx (one week ago), and a time that access point corresponding to Bxxxxx is most recently accessed is earliest to the current time (one month ago). The smart phone 50 presents Cxxxxx at a first position of the list 51 of access points from top to down, presents Exxxxx at a second position and presents Bxxxxx at a third position. Meanwhile, the time interval from the time that the smart phone 50 most recently accessed the corresponding access point to the current time is displayed at a designated position 52 at a right side of each SSID.

In step 308, the identifier of each of the wireless access points is presented in the list of access points according to a predetermined order.

Wherein the predetermined order includes: an English dictionary order, a far-to-close order of a distance between the wireless access point and the terminal, or a strong-to-weak order of a strength of a signal of the wireless access point received by the terminal device.

If it is determined that none of the identifiers of the wireless access points scanned by the terminal has a corresponding accessing record stored in the terminal, it means that none of the wireless access point has ever been accessed by the terminal device. In this case, the identifiers of the wireless access points may be presented in the list of access points in an English alphabet order, a strong-to-weak order of the signal or a far-to-close order of the distance.

For example, when they are presented in an English alphabet order, an identifier of a wireless access point which has an initial letter in the front of the English dictionary is presented at a topmost end of the list of access points. For identifiers with a same initial letter, second letters will then be compared according to the English dictionary order, and so on, so forth.

In addition, when the identifiers of the wireless access points also include Arabic numerals, the terminal presents the identifiers with initial characters being English letters in priority at the topmost end of the list of access points, and secondly presents the identifiers with initial characters being Arabic numerals. That is, the priority of English letters is higher than that of Arabic numerals. Similarly, in case where initial characters of identifiers are a same Arabic numeral, second characters of the identifiers will then be compared.

When the list of access points is presented in a strong-to-weak order of the signal or a far-to-close order of the distance, the terminal may measure the strength of the signal sent by each of the access points, and present the identifiers of the wireless access points in the list of access points in a strong-to-weak order of the signal, where an identifier of an access point with the strongest signal is presented at the topmost end of the list of access points, and an identifier of an access point with the weakest signal is presented at the bottommost end of the list of access points. Alternatively, the terminal may also measure the distance between each of the access points and the terminal, and present the identifiers of the wireless access points in the list of access points in a far-to-close order of the distance, where an identifier of an access point closest to the terminal is presented at the topmost end of the list of access points, and an identifier of an access point farthest to the terminal is presented at the bottommost end of the list of access points.

In step 310, when the terminal accesses one wireless access point of the wireless access points, an accessing record corresponding to the identifier of the one wireless access point is updated or created.

For example, when the terminal device accesses one wireless access point of the wireless access points, and the one wireless access point is an access point corresponding to a predetermined identifier, the accessing record corresponding to the identifier of the one wireless access point is updated by the terminal device accordingly.

When the terminal accesses one wireless access point of the wireless access points, and the one wireless access point is not an access point corresponding to a predetermined identifier, an accessing record corresponding to the identifier of the one wireless access point is created by the terminal device.

For example, in case where the terminal device is a smart phone, and the wireless access point is a Wi-Fi access point, each time the smart phone accesses the Wi-Fi access point, a piece of accessing information is generated, and the accessing information contains information such as the time point of the current access. The smart phone updates or creates an accessing record corresponding to the identifier of the Wi-Fi access point according to the accessing information.

For example, when the smart phone has already stored the accessing record corresponding to the identifier of the Wi-Fi access point, the number of times that the smart phone accessed the Wi-Fi access point in the accessing record may be increased by 1. Alternatively, the time that the smart phone most recently accessed the Wi-Fi access point in the accessing record may be updated with the time of the current access.

When the smart phone has not stored an accessing record corresponding to the identifier of the Wi-Fi access point, a piece of accessing record may be created, and the number of times that the smart phone accessed the Wi-Fi access point in the accessing record may be set to 1. Alternatively, the time that the smart phone most recently accessed the Wi-Fi access point in the accessing record may be set to the time of the current access. The smart phone stores in local the identifier of the Wi-Fi access point and the newly created accessing record.

Accordingly, in the method for presenting a list of access points provided by the embodiment of the present disclosure, by acquiring an identifier of each of wireless access points scanned by a terminal device, if it is determined that the at least one identifiers include the at least one predetermined identifier, the terminal presents the at least one predetermined identifier in the list of access points according to the accessing record corresponding to the at least one predetermined identifier. An identifier of a wireless access point may be presented in the list of access points in a more conspicuous manner if it is determined that the scanned wireless access point is a wireless access point that the terminal has ever been connected to, thereby it may solve the problem in the related art that when a large number of Wi-Fi access points are scanned by the terminal, the user cannot quickly find the Wi-Fi access point which he/she intends to access, and it may achieve the objective of saving user's time and improving user experience.

Figure 6:
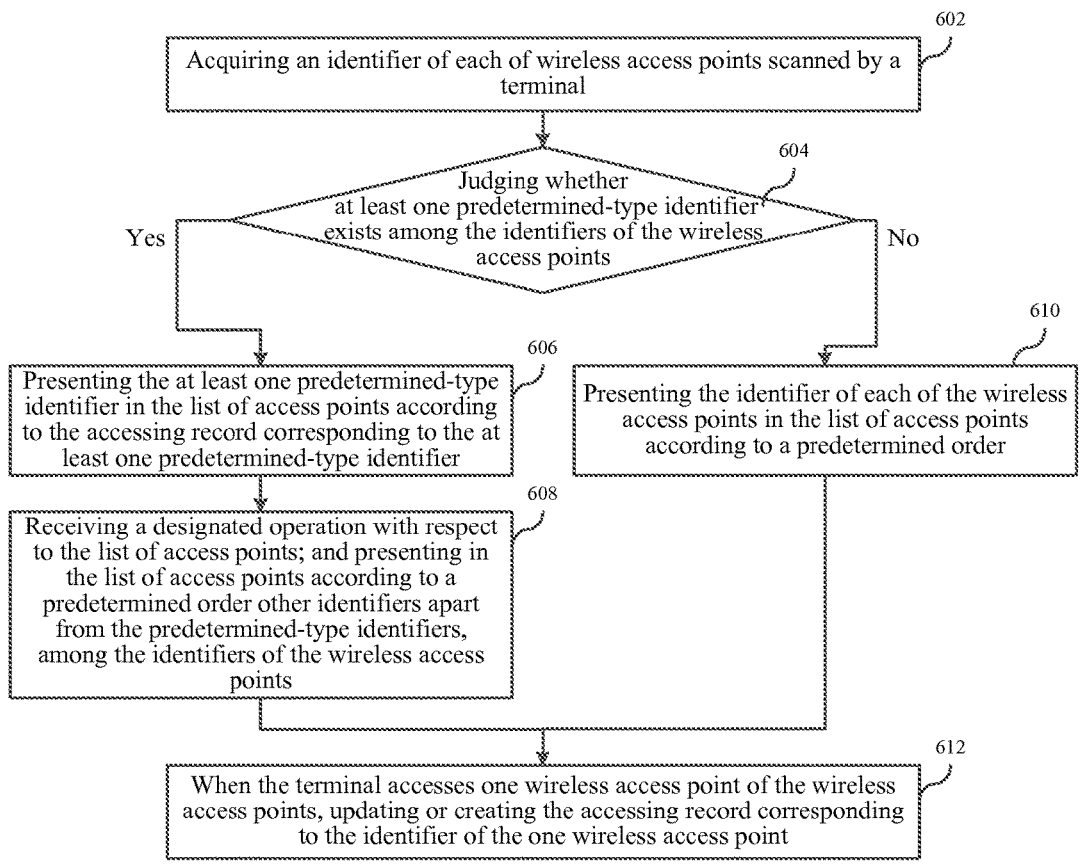
FIG. 6 is a flow chart of a method for presenting a list of access points according to still another exemplary embodiment.

FIG. 6 is a flow chart of a method for presenting a list of access points according to still another exemplary embodiment. In the present embodiment, the method for presenting a list of access points is applied in, for example, the implementing environment as shown in FIG. 1, wherein the method for presenting a list of access points is applied to the terminal 120 in the implementing environment as shown in FIG. 1. As shown in FIG. 6, the method for presenting a list of access points may include the following steps.

In step 602, an identifier of each of wireless access points scanned by the terminal is acquired.

Wherein an identifier of a wireless access point may be a SSID of the corresponding wireless access point or other network devices.

For example, in case where the terminal is a smart phone, the wireless access point is a Wi-Fi access point, and the identifier of the access point is a SSID of the access point, and when the smart phone scans the access points, after it receives a beacon frame periodically sent by a Wi-Fi access point near the smart phone, the smart phone sends a probe request frame to the Wi-Fi access point. After receiving the probe request frame, the Wi-Fi access point returns a probe response frame carrying with a SSID of the Wi-Fi access point to the smart phone.

In step 604, it is determined whether at least one predetermined identifier exists among the identifiers of the wireless access points; if it exists, the method proceeds to step 606; and if it does not exist, the method proceeds to step 610.

The predetermined identifier is an identifier corresponding to an accessing record stored in the terminal, and the accessing record is for indicating historical information that the terminal has ever accessed the wireless access point corresponding to the predetermined identifier.

Wherein the identifier of the Wi-Fi access point that has been ever accessed by the smart phone, and the accessing record corresponding to the identifier of the Wi-Fi access point that has been ever accessed by the smart phone may be stored in advance in a local database of the smart phone. The accessing record may contain a number of times that the smart phone accessed the Wi-Fi access point, or the accessing record may contain a time point of each time the smart phone accessed the Wi-Fi access point, or the accessing record may contain both a number of times that the smart phone accessed the Wi-Fi access point and a time point of each time the smart phone accessed the Wi-Fi access point.

In step 606, the at least one predetermined identifier is presented in the list of access points according to the accessing record corresponding to the at least one predetermined identifier.

When the accessing record contains a number of times that the terminal accessed the wireless access point corresponding to the predetermined identifier, the at least one predetermined identifier is presented at a top end of the list of access points according to a large-to-small order of the number of times that the terminal accessed the wireless access point corresponding to the at least predetermined identifier. When the accessing record contains a time that the terminal most recently accessed the wireless access point corresponding to the predetermined identifier, the at least one predetermined identifier is presented at a top end of the list of access points according to a late-to-early order of the time that the terminal most recently accessed the wireless access point corresponding to the at least predetermined identifier.

For example, in case where the terminal is a smart phone, the wireless access point is a Wi-Fi access point, and the identifier of the access point is a SSID of the access point, assuming that 6 Wi-Fi access points are scanned by the smart phone scans, the SSIDs of the 6 Wi-Fi access points are respectively Axxxx, Bxxxx, Cxxxxx, Dxxxxx, Exxxxx and Fxxxxx, wherein Bxxxx, Cxxxxx and Exxxxx are predetermined identifiers, that is to say, accessing records respectively corresponding to Bxxxx, Cxxxxx and Exxxxx are stored in the smart phone, indicating that the smart phone has ever accessed these Wi-Fi access points corresponding to these SSIDs. The schematic diagrams of presenting two kinds of predetermined identifiers provided by the embodiments of the present disclosure are respectively as shown in FIGS. 4 and 5.

As shown in FIG. 4, when an accessing record corresponding to a SSID stored in a smart phone 40 contains a number of accessing times that the smart phone accessed the access point corresponding to the SSID, the smart phone 40 may present Bxxxx, Cxxxxx and Exxxxx at a top end of a list 41 of access points according to a large-to-small order of the number of accessing times, wherein the access point corresponding to Cxxxxx has been accessed the most times (100 times), the access point corresponding to Exxxxx has been accessed ten times in the middle, the access point corresponding to Bxxxx has been accessed the least times (1 time). The smart phone 40 presents Cxxxxx at a first position of the list 41 of access points from top to down, presents Exxxxx at a second position and presents Bxxxxx at a third position. Meanwhile, the number of times accessed by the smart phone is displayed at a designated position 42 at a right side of each SSID.

Alternatively, as shown in FIG. 5, when an accessing record corresponding to a SSID stored in a smart phone 50 contains a time that the smart phone 50 most recently accessed the access point corresponding to the SSID, the smart phone 50 may present Bxxxx, Cxxxxx and Exxxxx at a top end of a list 51 of access points according to a late-to-early order of the time point of the most recent access, wherein a time that the smart phone 50 most recently accessed the access point corresponding to Cxxxxx is latest (one day ago), secondly is the access point corresponding to Exxxxx (one week ago), and a time that access point corresponding to Bxxxxx is most recently accessed is earliest to the current time (one month ago). The smart phone 50 presents Cxxxxx at a first position of the list 51 of access points from top to down, presents Exxxxx at a second position and presents Bxxxxx at a third position. Meanwhile, the time interval from the time that the smart phone 50 most recently accessed the corresponding access point to the current time is displayed at a designated position 52 at a right side of each SSID.

In step 608, a designated operation with respect to the list of access points is received; and other identifiers apart from the predetermined identifiers, among the identifiers of the wireless access points are presented in the list of access points according to a predetermined order.

Wherein the predetermined order includes: an English dictionary order, a far-to-close order of a distance between the wireless access point and the terminal, or a strong-to-weak order of a strength of a signal of the wireless access point received by the terminal.

When a control operation performed in the terminal from the user for presenting identifiers of other access points, the terminal may also present in the list of access points other identifiers apart from the predetermined identifier, among the identifiers of the scanned wireless access points, and other identifiers apart from the predetermined identifier may be referred to as non-predetermined identifiers. Since among the identifiers of the wireless access points, a non-predetermined identifier is an access point that the terminal has never accessed, the terminal may present the non-predetermined identifier in the list of access points in an English alphabet order, a strong-to-weak order of the signal or a far-to-close order of the distance.

For example, when they are presented in an English alphabet order, the terminal presents an identifier among these non-predetermined identifiers which has an initial letter in the front of the English dictionary is presented at a top end of the list of access points. For identifiers with a same initial letter, second letters will then be compared according to the English dictionary order, and so on, so forth.

In addition, when the identifiers of these non-predetermined identifiers also include Arabic numerals, the terminal presents the identifiers with initial characters being English letters in priority at the top end of the list of access points, and secondly presents the identifiers with initial characters being Arabic numerals. That is, the priority of English letters is higher than that of Arabic numerals. Similarly, in case where initial characters of identifiers are a same Arabic numeral, second characters of the identifiers will then be compared.

When these non-predetermined identifiers are presented in a strong-to-weak order of the signal or a far-to-close order of the distance, the terminal may measure the strength of the signal sent by each of the access points corresponding to these non-predetermined identifiers, and present these non-predetermined identifiers in the list of access points in a strong-to-weak order of the signal, wherein a non-predetermined identifier corresponding to the strongest signal is presented in priority at the top end of the list of access points, and a non-predetermined identifier corresponding to the weakest signal is presented at the bottom end of the list of access points. Alternatively, the terminal may also measure the distance between each of the access points corresponding to the non-predetermined identifiers and the terminal, and present the non-predetermined identifiers in the list of access points in a far-to-close order of the distance, wherein an identifier of an access point closest to the terminal is presented at the most end of the list of access points, and an identifier of an access point farthest to the terminal is presented at the most end of the list of access points.

Wherein, when the terminal device presents other identifiers apart from the predetermined identifiers, among the identifiers of the wireless access points, in the list of access points according to a predetermined order, other identifiers apart from the predetermined identifiers, among the identifiers of the wireless access points may be presented below the at least one predetermined identifier.

Wherein the terminal device may present the identifiers of the scanned wireless access points in a same display area of the list of access points, wherein the predetermined identifiers are presented at an upper part of the display area, and the non-predetermined identifiers are presented at a lower part of the display area.

Figure 7:
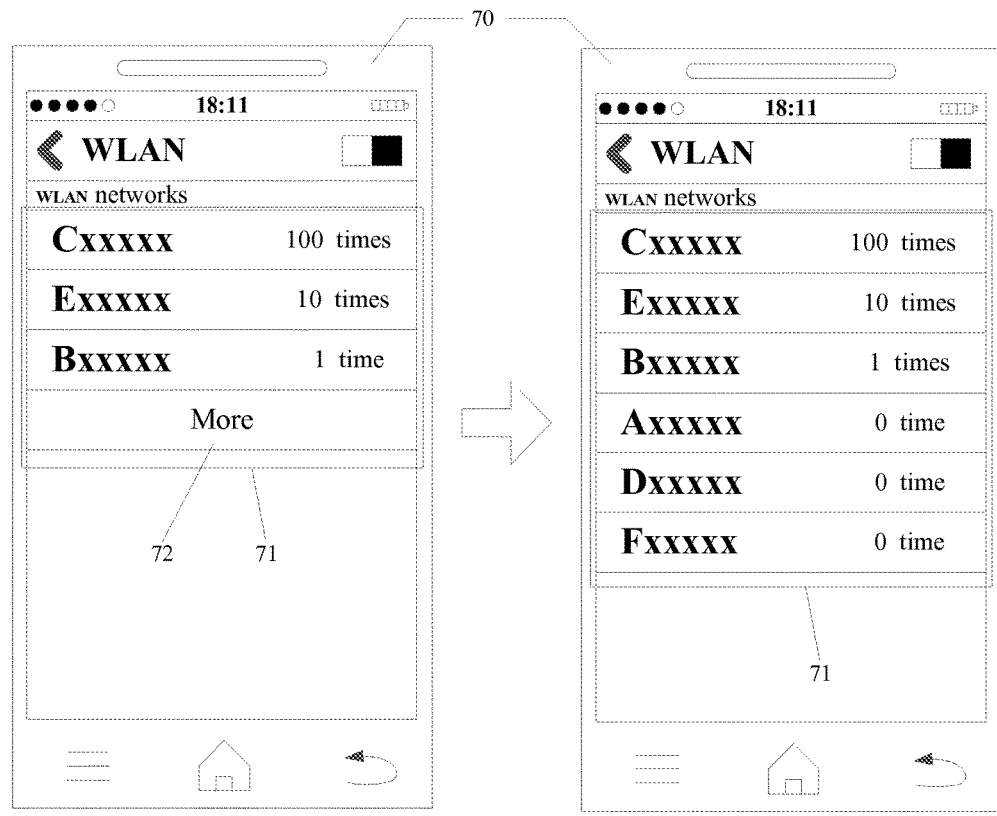
FIG. 7 is a schematic diagram of presenting a non-predetermined identifier according to still another exemplary embodiment.

For example, in case where the terminal device is a smart phone, the wireless access point is a Wi-Fi access point, the identifier of the access point is a SSID of the access point, and among the SSIDs scanned by the smart phone, Bxxxx, Cxxxxx and Exxxxx are predetermined identifiers, Axxxx, Dxxxxx and Fxxxxx are non-predetermined identifiers, referring to FIG. 7, which is a schematic diagram of presenting a non-predetermined identifier, wherein at an initial moment, the predetermined identifiers Bxxxx, Cxxxxx and Exxxxx are presented one by one at a top end of a list 71 of access points displayed by a smart phone 70. A "more" tag 72 is below Exxxxx. If he/she does not intend to make the smart phone access to a Wi-Fi access point corresponding to any one of Bxxxx, Cxxxxx and Exxxxx, the user may hit the tag 72. The smart phone 70 presents the non-predetermined identifiers Axxxx, Dxxxxx and Fxxxxx one by one below Exxxxx in the list 71 of access points, for the user to select one of the non-predetermined identifiers to connect, wherein the presenting order is an English dictionary order.

Alternatively, when the terminal device presents other identifiers apart from the predetermined identifiers, among the identifiers of the wireless access points, in the list of access points according to a predetermined order, the at least one predetermined identifier may also be hidden.

Here, the terminal device may also present the identifiers of the scanned wireless access points in two separate display areas up and down in the list of access points, wherein the predetermined identifiers are presented in the upward display area, and the non-predetermined identifiers are presented in the downward display area.

Figure 8:
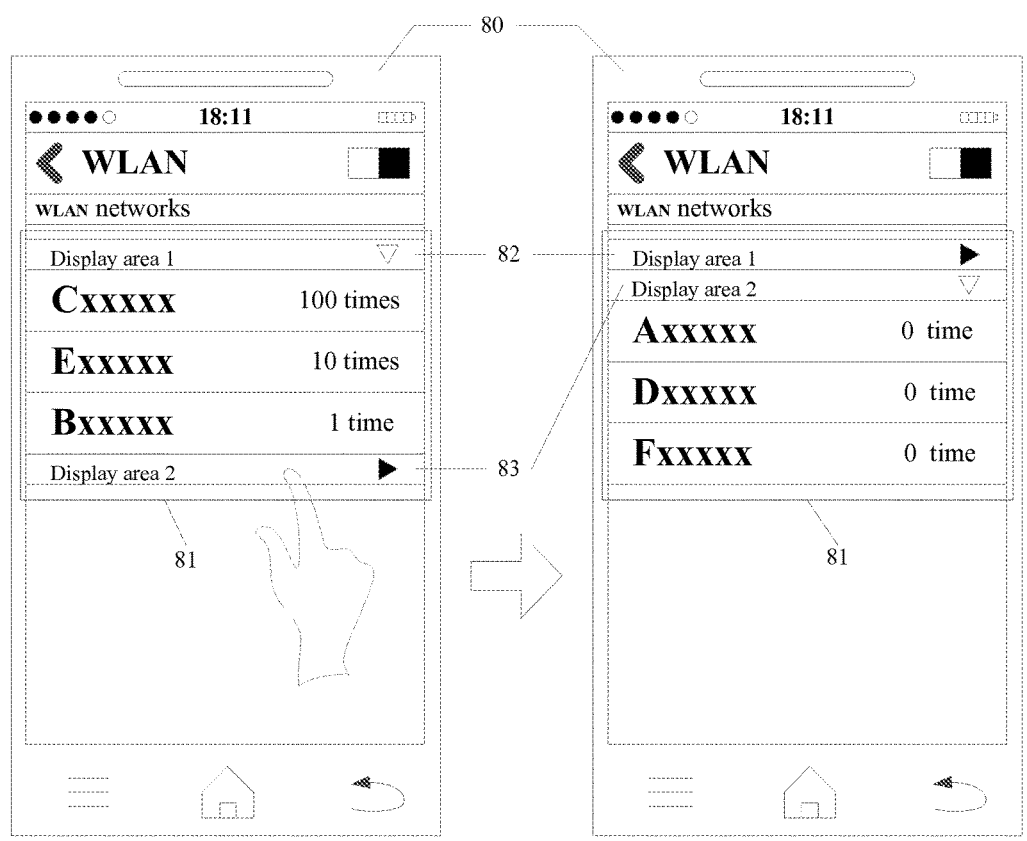
FIG. 8 is a schematic diagram of presenting another non-predetermined identifier according to still another exemplary embodiment.

Similarly, in case where the terminal device is a smart phone, the wireless access point is a Wi-Fi access point, the identifier of the access point is a SSID of the access point, and among the SSIDs scanned by the smart phone, Bxxxx, Cxxxxx and Exxxxx are predetermined identifiers, Axxxx, Dxxxxx and Fxxxxx are non-predetermined identifiers, referring to FIG. 8, which is a schematic diagram of presenting another non-predetermined identifier, wherein a list 81 of access points displayed by a smart phone 80 includes two foldable tags up and down, respectively a tag 82 and a tag 83. At an initial moment, the tag 82 is in an unfolded state, and in the unfolded area the predetermined identifiers Bxxxx, Cxxxxx and Exxxxx are presented one by one. The tag 83 is in a folded state. If he/she does not intend to make the smart phone access to a Wi-Fi access point corresponding to any one of Bxxxx, Cxxxxx and Exxxxx, the user may hit the tag 83. The smart phone 80 unfolds the tag 83, and presents the non-predetermined identifiers Axxxx, Dxxxxx and Fxxxxx one by one in the unfolded area, for the user to select one to connect, wherein the presenting order is an English dictionary order. Meanwhile, the smart phone 80 changes the currently-unfolded tag 82 to the folded state again.

In step 610, the identifier of each of the wireless access points is presented in the list of access points according to a predetermined order.

Wherein the predetermined order includes: an English dictionary order, a far-to-close order of a distance between the wireless access point and the terminal device, or a strong-to-weak order of a strength of a signal of the wireless access point received by the terminal device.

If it is determined that none of the identifiers of the wireless access points scanned by the terminal device has a corresponding accessing record stored in the terminal device, it means that a wireless access point which the terminal device has ever accessed does not exist among the scanned wireless access points. In this case, similarly to the order for presenting the non-predetermined identifiers in the above step 608, the identifiers of the wireless access points may be presented in the list of access points in an English alphabet order, a strong-to-weak order of the signal or a far-to-close order of the distance.

For example, when they are presented in an English alphabet order, an identifier of a wireless access point which has an initial letter in the front of the English dictionary is presented at a topmost end of the list of access points. For identifiers with a same initial letter, second letters will then be compared according to the English dictionary order, and so on, so forth.

In addition, when the identifiers of the wireless access points also include Arabic numerals, the terminal device presents the identifiers with initial characters being English letters in priority at the topmost end of the list of access points, and secondly presents the identifiers with initial characters being Arabic numerals. That is, the priority of English letters is higher than that of Arabic numerals. Similarly, in case where initial characters of identifiers are a same Arabic numeral, second characters of the identifiers will then be compared.

When the list of access points is presented in a strong-to-weak order of the signal or a far-to-close order of the distance, the terminal device may measure the strength of the signal sent by each of the access points, and present the identifiers of the wireless access points in the list of access points in a strong-to-weak order of the signal, wherein an identifier of an access point with the strongest signal is presented at the topmost end of the list of access points, and an identifier of an access point with the weakest signal is presented at the bottommost end of the list of access points. Alternatively, the terminal may also measure the distance between each of the access points and the terminal, and present the identifiers of the wireless access points in the list of access points in a far-to-close order of the distance, wherein an identifier of an access point closest to the terminal is presented at the topmost end of the list of access points, and an identifier of an access point farthest to the terminal is presented at the bottommost end of the list of access points.

In step 612, when the terminal accesses one wireless access point of the wireless access points, an accessing record corresponding to the identifier of the one wireless access point is updated or created.

Wherein when the terminal accesses one wireless access point of the wireless access points, and the one wireless access point is an access point corresponding to a predetermined identifier, the accessing record corresponding to the identifier of the one wireless access point is updated.

When the terminal accesses one wireless access point of the wireless access points, and the one wireless access point is not an access point corresponding to a predetermined identifier, an accessing record corresponding to the identifier of the one wireless access point is created.

For example, in case where the terminal is a smart phone, and the wireless access point is a Wi-Fi access point, each time the smart phone accesses the Wi-Fi access point, a piece of accessing information is generated, and the accessing information contains information such as the time point of the current access. The smart phone updates or creates an accessing record corresponding to the identifier of the Wi-Fi access point according to the accessing information.

For example, when the smart phone has already stored the accessing record corresponding to the identifier of the Wi-Fi access point, the number of times that the smart phone accessed the Wi-Fi access point in the accessing record may be increased by 1. Alternatively, the time that the smart phone most recently accessed the Wi-Fi access point in the accessing record may be updated with the time of the current access.

When the smart phone has not stored an accessing record corresponding to the identifier of the Wi-Fi access point, a piece of accessing record may be newly created, and the number of times that the smart phone accessed the Wi-Fi access point in the accessing record may be set to 1. Alternatively, the time that the smart phone most recently accessed the Wi-Fi access point in the accessing record may be set to the time of the current access. The smart phone stores in local the identifier of the Wi-Fi access point and the newly created accessing record.

Accordingly, in the method for presenting a list of access points provided by the embodiment of the present disclosure, by acquiring an identifier of each of wireless access points scanned by a terminal, if it is determined that at least one predetermined identifier exists among the identifiers of the wireless access points, the terminal presents the at least one predetermined identifier in the list of access points according to the accessing record corresponding to the at least one predetermined identifier, such that an identifier of a wireless access point may be presented in the list of access points in a more conspicuous manner if it is determined that the scanned wireless access point is a wireless access point that the terminal has ever been connected to, thereby it may solve the problem in the related art that when a large number of Wi-Fi access points are scanned by the terminal, the user cannot quickly find the Wi-Fi access point which he/she intends to access, and it may achieve the objective of saving user's time and improving user experience.

The following are device embodiments of the present disclosure, which may be configured to perform the method embodiments of the present disclosure. For details that are not disclosed in the device embodiments of the present disclosure, reference may be made to the method embodiments of the present disclosure.

Figure 9:
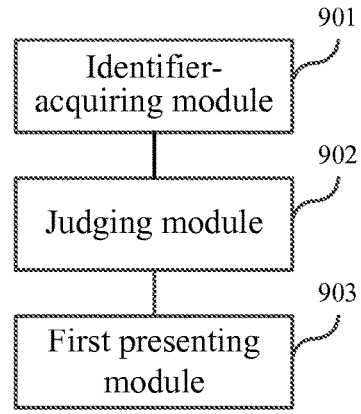
FIG. 9 is a block diagram of a device for presenting a list of access points according to an exemplary embodiment.

FIG. 9 is a block diagram of a device for presenting a list of access points according to an exemplary embodiment. As shown in FIG. 9, the device for presenting a list of access points is applied to the terminal device 120 in the implementing environment as shown in FIG. 1. The device for presenting a list of access points includes but not limited to: an identifier-acquiring module 901, a determining module 902 and a first presenting module 903.

The identifier-acquiring module 901 is configured to acquire at least one identifiers corresponding to at least one wireless access points scanned by a terminal device.

The determining module 902 is configured to determine whether at least one predetermined identifier exists among the identifiers of the wireless access points, wherein the predetermined identifier is an identifier corresponding to an accessing record stored in the terminal device, and the accessing record is for indicating historical information that the terminal device has ever accessed the wireless access point corresponding to the predetermined identifier.

The first presenting module 903 is configured to, if a result of the determining module 902 is that the at least one predetermined identifier exists, present the at least one predetermined identifier in the list of access points according to the accessing record corresponding to the at least one predetermined identifier.

Accordingly, in the device for presenting a list of access points provided by the embodiment of the present disclosure, by acquiring an identifier of each of wireless access points scanned by a terminal device, if it is determined that at least one predetermined identifier exists among the identifiers of the wireless access points, the terminal device presents the at least one predetermined identifier in the list of access points according to the accessing record corresponding to the at least one predetermined identifier, such that an identifier of a wireless access point may be presented in the list of access points in a more conspicuous manner if it is determined that the scanned wireless access point is a wireless access point that the terminal device has ever been connected to, thereby it may solve the problem in the related art that when a large number of Wi-Fi access points are scanned by the terminal device, the user cannot quickly find the Wi-Fi access point which he/she intends to access, and it may achieve the objective of saving user's time and improving user experience.

Figure 10:
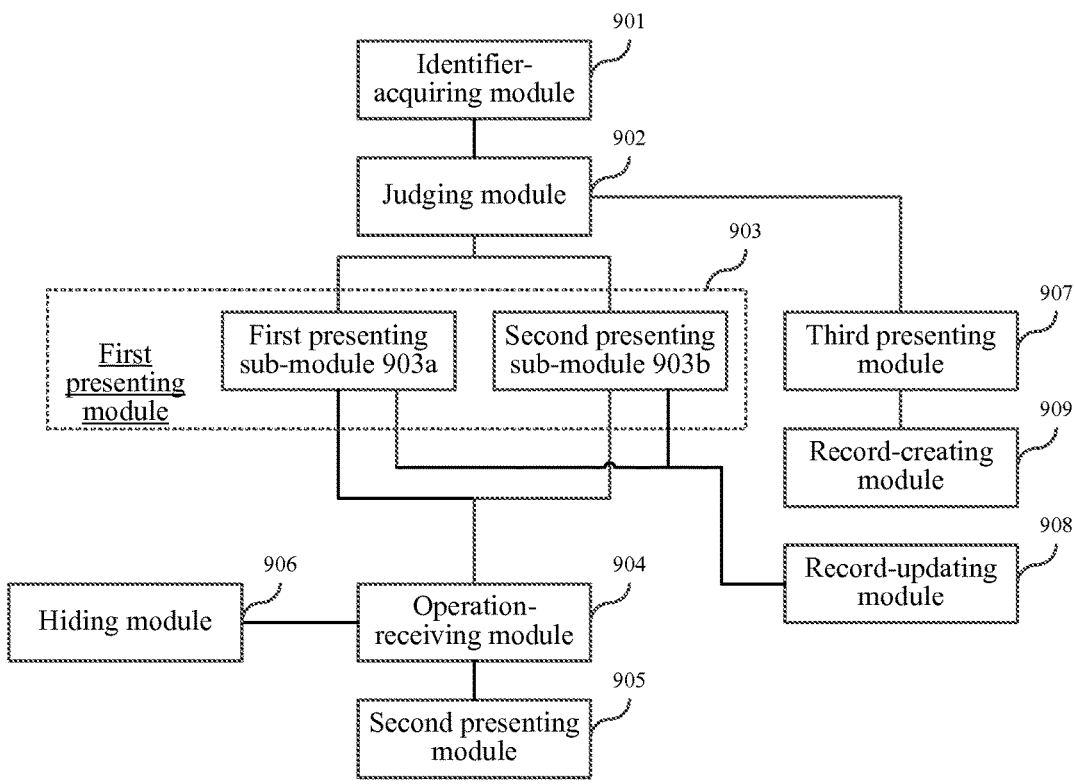
FIG. 10 is a block diagram of a device for presenting a list of access points according to another exemplary embodiment.

FIG. 10 is a block diagram of a device for presenting a list of access points according to another exemplary embodiment. As shown in FIG. 10, the device for presenting a list of access points is applied to the terminal 120 in the implementing environment as shown in FIG. 1. The device for presenting a list of access points includes but not limited to: an identifier-acquiring module 901, a determining module 902 and a first presenting module 903.

The identifier-acquiring module 901 is configured to acquire at least one identifiers corresponding to at least one wireless access points scanned by a terminal device.

The determining module 902 is configured to determine whether at least one predetermined identifier exists among the identifiers of the wireless access points, wherein the predetermined identifier is an identifier corresponding to an accessing record stored in the terminal, and the accessing record is for indicating historical information that the terminal has ever accessed the wireless access point corresponding to the predetermined identifier.

The first presenting module 903 is configured to, if a result of the determining module 902 is that the at least one predetermined identifier exists, present the at least one predetermined identifier in the list of access points according to the accessing record corresponding to the at least one predetermined identifier.

Optionally, the first presenting module 903 includes: a first presenting sub-module 903*a* and a second presenting sub-module 903*b*.

The first presenting sub-module 903*a* is configured to, when the accessing record contains a number of times that the terminal accessed the wireless access point corresponding to the predetermined identifier, present the at least one predetermined identifier at a top end of the list of access points according to a large-to-small order of the number of times that the terminal accessed the wireless access point corresponding to the at least predetermined identifier.

The second presenting sub-module 903*b* is configured to, when the accessing record contains a time that the terminal most recently accessed the wireless access point corresponding to the predetermined identifier, present the at least one predetermined identifier at the top end of the list of access points according to a late-to-early order of the time that the terminal most recently accessed the wireless access point corresponding to the at least predetermined identifier.

Optionally, the device further includes: an operation-receiving module 904 and a second presenting module 905.

The operation-receiving module 904 is configured to receive a designated operation with respect to the list of access points.

The second presenting module 905 is configured to present in the list of access points according to a predetermined order other identifiers apart from the predetermined identifiers, among the identifiers of the wireless access points.

The predetermined order includes: an English dictionary order, a far-to-close order of a distance between the wireless access point and the terminal, or a strong-to-weak order of a strength of a signal of the wireless access point received by the terminal.

Optionally, the second presenting module 905 is configured to present below the at least one predetermined identifier other identifiers apart from the predetermined identifiers, among the identifiers of the wireless access points.

Optionally, the device further includes: a hiding module 906.

The hiding module 906 is configured to hide the at least one predetermined identifier.

Optionally, the device further includes: a third presenting module 907.

The third presenting module 907 is configured to, if the result of the determining module 902 is that the at least one predetermined identifier does not exist, present the identifier of each of the wireless access points in the list of access points according to a predetermined order.

The predetermined order includes: an English dictionary order, a far-to-close order of a distance between the wireless access point and the terminal, or a strong-to-weak order of a strength of a signal of the wireless access point received by the terminal.

Optionally, the device further includes: a record-updating module 908 and a record-creating module 909.

The record-updating module 908 is configured to, when the terminal accesses one wireless access point of the wireless access points, and the one wireless access point is an access point corresponding to a predetermined identifier, update the accessing record corresponding to the identifier of the one wireless access point.

The record-creating module 909 is configured to, when the terminal accesses one wireless access point of the wireless access points, and the one wireless access point is not an access point corresponding to a predetermined identifier, create an accessing record corresponding to the identifier of the one wireless access point.

Accordingly, in the device for presenting a list of access points provided by the embodiment of the present disclosure, by acquiring an identifier of each of wireless access points scanned by a terminal, if it is determined that at least one predetermined identifier exists among the identifiers of the wireless access points, the terminal presents the at least one predetermined identifier in the list of access points according to the accessing record corresponding to the at least one predetermined identifier, such that an identifier of a wireless access point may be presented in the list of access points in a more conspicuous manner if it is determined that the scanned wireless access point is a wireless access point that the terminal has ever been connected to, thereby it may solve the problem in the related art that when a large number of Wi-Fi access points are scanned by the terminal, the user cannot quickly find the Wi-Fi access point which he/she intends to access, and it may achieve the objective of saving user's time and improving user experience.

With respect to the devices in the above embodiments, specific operations performed by each modules have been described in detail in the embodiments of related method, and detailed description are omitted herein.

Figure 11:
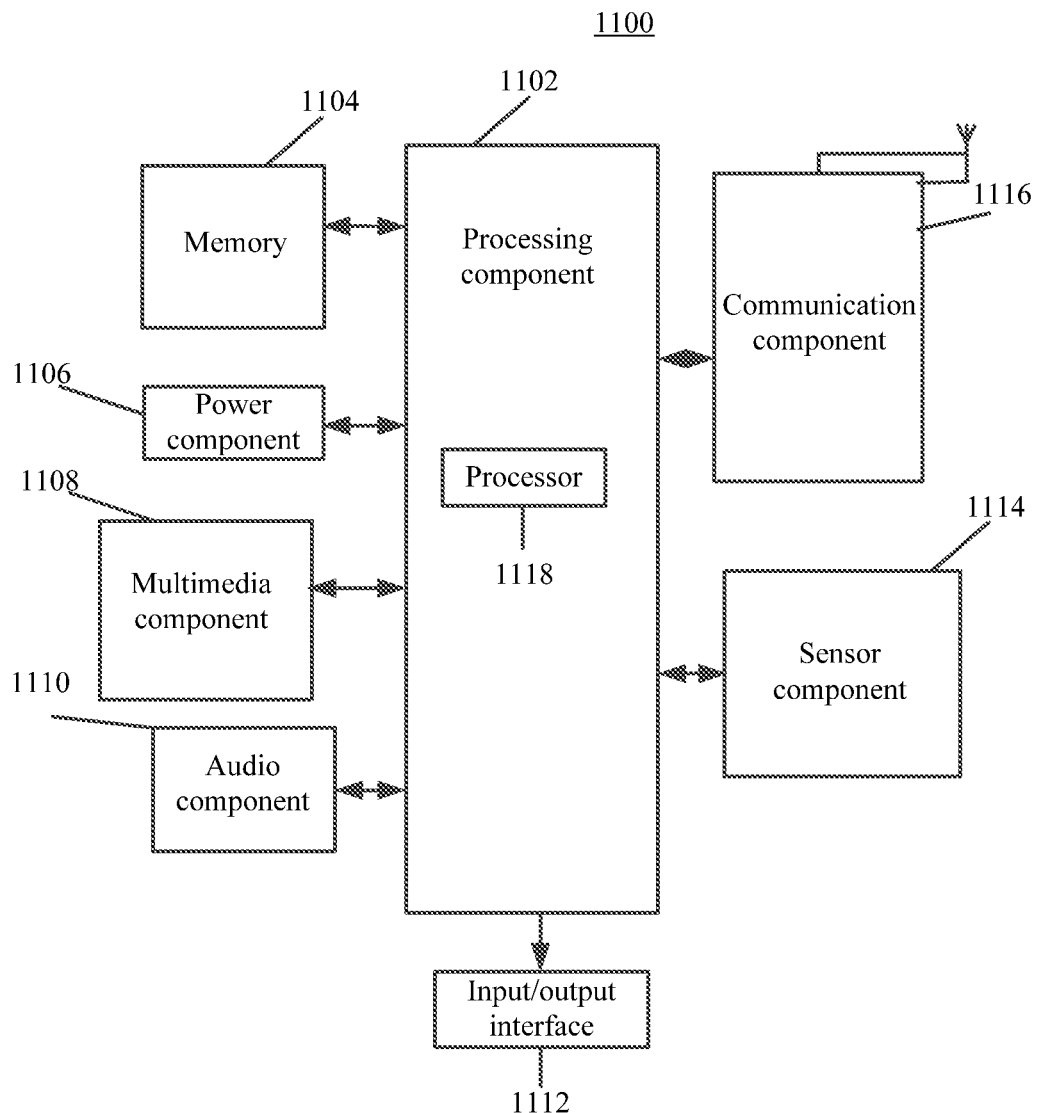
FIG. 11 is a block diagram of a device for presenting a list of access points according to an exemplary embodiment.

FIG. 11 is a block diagram of a device 1100 for presenting a list of access points according to an exemplary embodiment. For example, the device 1100 may be a mobile phone, a computer, a digital broadcast terminal, a messaging device, a gaming console, a tablet, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1118 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 1104 also stores one or more modules configured to be executed by one or more processors 1118, to perform all or part of the steps of the method as shown in any one of the above FIGS. 2, 3 and 6.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic components, for performing the above method.

In exemplary embodiments, there is also provided a non-transitory computer-readable storage medium including instructions, such as included in the memory 1104, executable by the processor 1118 in the device 1100, for performing the methods for presenting a list of access points. For example, the non-transitory computer-readable storage medium may be a ROM, a RAM, a CD-ROM, a magnetic tape, a floppy disc, an optical data storage device, and the like.

It will be appreciated that the present disclosure is not limited to the exact construction that has been described above and illustrated in the accompanying drawings, and that various modifications and changes can be made without departing from the scope thereof. The different exemplary embodiments may be combined by a person having ordinary skill in the art without undue experimentation. It is intended that the scope of the invention only be limited by the appended claims.

What is claimed is:

1. A method for presenting access points, comprising:
   acquiring, by a terminal, at least one identifier of at least one wireless access points scanned by the terminal;
   determining, by the terminal, whether the at least one identifier include at least one predetermined identifier, wherein each of the at least one predetermined identifier is an identifier corresponding to an accessing record stored in the terminal, and the accessing record indicates historical information that the terminal has ever accessed wireless access points corresponding to the at least one predetermined identifier;
   when the terminal determines that the at least one identifier include the at least one predetermined identifier, presenting the at least one predetermined identifier in an initial part of a list of currently-scanned access points according to the accessing record corresponding to the at least one predetermined identifier; and
   presenting in the list of currently-scanned access points, according to a predetermined order, non-predetermined identifiers apart from the at least one predetermined identifier, among the identifiers of the wireless access points, wherein the non-predetermined identifiers include access points which the terminal has never accessed,
   wherein the list of currently-scanned access points includes a first foldable tag up and a second foldable tag down, the first foldable tag is unfolded and presents the at least one predetermined identifier identifying a first subset of currently-scanned access points, which the terminal accessed in the past, at an initial moment immediately upon determination, by the terminal, that the at least one identifier include the at least one predetermined identifier, and the second foldable tag is in a folded state and hides the non-predetermined identifiers identifying a second subset of currently-scanned access points, which the terminal has never accessed, at the initial moment;
   wherein the second foldable tag in the folded state is unfolded and presents the non-predetermined identifiers identifying the second subset of currently-scanned access points, which the terminal has never accessed, when an operation is received;
   wherein presenting the at least one predetermined identifier in the list of currently-scanned access points according to the accessing record corresponding to the at least one predetermined identifier comprises:
   when the accessing record contains a number of times that the terminal accessed the wireless access point corresponding to the predetermined identifier, presenting the at least one predetermined identifier at a top end of the list of currently-scanned access points according to a large-to-small order of the number of times that the terminal accessed the wireless access point corresponding to the at least one predetermined identifier;
   when the accessing record contains a time that the terminal most recently accessed the wireless access point corresponding to the predetermined identifier, presenting the at least one predetermined identifier at the top end of the list of currently-scanned access points according to a late-to-early order of the time that the terminal most recently accessed the wireless access point corresponding to the at least one predetermined identifier; and
   wherein the predetermined order comprises: an English dictionary order, a far-to-close order of a distance between the wireless access point and the terminal, or a strong-to-weak order of a strength of a signal of the wireless access point received by the terminal.

2. The method according to claim 1, further comprising:
   if the result of the determining is that the at least one predetermined identifier does not exist, presenting the identifier of each of the wireless access points in the list of currently-scanned access points according to a predetermined order,
   wherein the predetermined order comprises:
   an English dictionary order,
   a far-to-close order of a distance between the wireless access point and the terminal, or
   a strong-to-weak order of a strength of a signal of the wireless access point received by the terminal.

3. The method according to claim 1, wherein the method further comprises:
   when the terminal accesses one wireless access point of the wireless access points, and the one wireless access point is an access point corresponding to the predetermined identifier, updating the accessing record corresponding to the identifier of the wireless access point; and
   when the terminal accesses one wireless access point of the wireless access points, and the one wireless access point is not an access point corresponding to the predetermined identifier, creating an accessing record corresponding to the identifier of the wireless access point.

4. The method according to claim 1, further comprising:
   displaying, in the second foldable tag, the non-predetermined identifiers when the second foldable tag is hit.

5. A terminal device for presenting a list of access points, comprising:
   a processor; and
   a memory for storing instructions executable by the processor;
   wherein the processor is configured to:
   acquire at least one identifier of each of at least one wireless access points scanned by the terminal;
   determine whether the at least one identifier includes at least one predetermined identifier, wherein each predetermined identifier is an identifier corresponding to an accessing record stored in the terminal device, and the accessing record indicates historical information that the terminal device has ever accessed wireless access point corresponding to the at least one predetermined identifier; and when the terminal device determines that the at least one identifier include the at least one predetermined identifier, present the at least one predetermined identifier in an initial part of the list of currently-scanned access points according to the accessing record corresponding to the at least one predetermined identifier;

present in the list of currently-scanned access points, according to a predetermined order, non-predetermined identifiers apart from the at least one predetermined identifier, among the identifiers of the wireless access points, wherein the non-predetermined identifiers include access points which the terminal has never accessed, when the accessing record contains a number of times that the terminal device accessed the wireless access point corresponding to each of the at least one predetermined identifier, present the at least one predetermined identifier at a top end of the list of currently-scanned access points according to a large-to-small order of the number of times that the terminal device accessed the wireless access point corresponding to the at least one predetermined identifier; and when the accessing record contains a time that the terminal device most recently accessed the wireless access point corresponding to each of the at least one predetermined identifier, present the at least one predetermined identifier at the top end of the list of currently-scanned access points according to a late-to-early order of the time that the terminal device most recently accessed the wireless access point corresponding to the at least one predetermined identifier;

wherein the list of currently-scanned access points includes a first foldable tag up and a second foldable tag down, the first foldable tag is unfolded and presents the at least one predetermined identifier identifying a first subset of currently-scanned access points, which the terminal accessed in the past, at an initial moment immediately upon determination, by the terminal, that the at least one identifier include the at least one predetermined identifier, and the second foldable tag is in a folded state and hides non-predetermined identifiers identifying a second subset of currently-scanned access points, which the terminal has never accessed, at the initial moment;

wherein the second foldable tag in the folded state is unfolded and presents the non-predetermined identifiers identifying the second subset of currently-scanned access points, which the terminal has never accessed, when an operation is received; and wherein the predetermined order comprises: an English dictionary order, a far-to-close order of a distance between the wireless access point and the terminal device, or a strong-to-weak order of a strength of a signal of the wireless access point received by the terminal device.

6. The terminal device according to claim 5, wherein the processor is further configured to:

if the result of the determining module is that the at least one predetermined identifier does not exist, present the identifier of each of the wireless access points in the list of currently-scanned access points according to a predetermined order, wherein the predetermined order comprises:
an English dictionary order, a far-to-close order of a distance between the wireless access point and the terminal device, or a strong-to-weak order of a strength of a signal of the wireless access point received by the terminal device.

7. The terminal device according to claim 5, further configured to:

when the terminal device accesses one wireless access point of the wireless access points, and the one wireless access point is an access point corresponding to the predetermined identifier, update the accessing record corresponding to the identifier of the one wireless access point; and when the terminal device accesses one wireless access point of the wireless access points, and the one wireless access point is not an access point corresponding to the predetermined identifier, create an accessing record corresponding to the identifier of the wireless access point.

8. A non-transitory storage medium having stored therein instructions that, when executed by one or more processors of a terminal device for presenting a list of currently-scanned access points, cause the terminal device to perform:

acquiring at least one identifier of at least one wireless access points scanned by the terminal device;

determining whether the at least one identifier include at least one predetermined identifier, wherein each of the at least one predetermined identifier is an identifier corresponding to an accessing record stored in the terminal device, and the accessing record indicates historical information that the terminal device has ever accessed wireless access point corresponding to the at least one predetermined identifier;

when the terminal device determines that the at least one identifier include the at least one predetermined identifier, presenting the at least one predetermined identifier in an initial part of the list of currently-scanned access points according to the accessing record corresponding to the at least one predetermined identifier;

when the accessing record contains a number of times that the terminal accessed the wireless access point corresponding to the predetermined identifier, presenting the at least one predetermined identifier at a top end of the list of currently-scanned access points according to a large-to-small order of the number of times that the terminal accessed the wireless access point corresponding to the at least one predetermined identifier; and when the accessing record contains a time that the terminal most recently accessed the wireless access point corresponding to the predetermined identifier, presenting the at least one predetermined identifier at the top end of the list of currently-scanned access points according to a late-to-early order of the time that the terminal most recently accessed the wireless access point corresponding to the at least one predetermined identifier, wherein the list of currently-scanned access points includes a first foldable tag up and a second foldable tag down, the first foldable tag is unfolded and presents the at least one predetermined identifier identifying a first subset of currently-scanned access points, which the terminal accessed in the past, at an initial moment immediately upon determination, by the terminal, that the at least one identifier include the at least one predetermined identifier, and the second foldable tag is in a folded state and hides non-predetermined identifiers identifying a second subset of currently-scanned access points, which the terminal has never accessed, at the initial moment;

wherein the second foldable tag in the folded state is unfolded and presents the non-predetermined identifiers identifying the second subset of currently-scanned access points, which the terminal has never accessed, when an operation is received; and wherein the predetermined order comprises: an English dictionary order, a far-to-close order of a distance between the wireless access point and the terminal, or a strong-to-weak order of a strength of a signal of the wireless access point received by the terminal.

9. The terminal device according to claim 5, wherein the processor is further configured to:

display, in the second foldable tag, the non-predetermined identifiers when the second foldable tag is hit.

10. The non-transitory storage medium of claim 8, wherein the instructions, when executed by one or more processors of the terminal device, further cause the terminal device to perform:

displaying, in the second foldable tag, the non-predetermined identifiers when the second foldable tag is hit.

* * * * *